United States Patent

Oshima

(10) Patent No.: US 6,818,031 B2
(45) Date of Patent: Nov. 16, 2004

(54) POLISHING COMPOSITION

(75) Inventor: Yoshiaki Oshima, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/128,365

(22) Filed: Apr. 24, 2002

(65) Prior Publication Data

US 2002/0194789 A1 Dec. 26, 2002

(30) Foreign Application Priority Data

Apr. 27, 2001 (JP) .......................................... 2001-133650

(51) Int. Cl.$^7$ ............................. C09G 1/02; C09G 1/04; B24B 1/00
(52) U.S. Cl. ............................. 51/308; 106/3; 438/692; 438/693; 216/89; 216/96
(58) Field of Search .......................... 51/307, 308, 309; 106/3; 438/692, 693; 510/367, 368, 369, 359, 396, 397; 216/89, 96

(56) References Cited

U.S. PATENT DOCUMENTS

| 5,783,489 A | 7/1998 | Kaufman et al. |
| 5,958,288 A | 9/1999 | Mueller et al. |
| 5,980,775 A | 11/1999 | Grumbine et al. |
| 6,015,506 A | 1/2000 | Streinz et al. |
| 6,033,596 A | 3/2000 | Kaufman et al. |
| 6,039,891 A | 3/2000 | Kaufman et al. |
| 6,068,787 A | 5/2000 | Grumbine et al. |
| 6,149,696 A | 11/2000 | Jia |
| 6,159,076 A | 12/2000 | Sun et al. |
| 6,309,434 B1 * | 10/2001 | Ohashi .......................... 106/3 |
| 6,316,366 B1 | 11/2001 | Kaufman et al. |
| 6,383,414 B1 * | 5/2002 | Pasch .................... 252/389.21 |
| 6,478,835 B2 * | 11/2002 | Miyata et al. ................. 51/308 |
| 2001/0029705 A1 * | 10/2001 | Miyata ......................... 51/308 |
| 2001/0049913 A1 * | 12/2001 | Miyata ......................... 51/308 |

FOREIGN PATENT DOCUMENTS

| JP | 9-204657 | 8/1997 |
| JP | 9-208934 | 8/1997 |
| JP | 10-226784 | 8/1998 |
| JP | 10-265766 | 10/1998 |
| JP | 11-246849 | 9/1999 |
| JP | 2000-042904 | 2/2000 |
| WO | WO 01/12740 A1 | 2/2001 |
| WO | WO 01/98201 | 12/2003 |

OTHER PUBLICATIONS

Chinese Office Action, Feb. 13, 2004, 4 pp.

* cited by examiner

*Primary Examiner*—Michael Marcheschi
(74) *Attorney, Agent, or Firm*—Oblon, Spivak, McClelland, Maier & Neustadt, P.C.

(57) ABSTRACT

A polishing composition comprising an abrasive, an oxidizing agent, a polishing accelerator, and water, wherein the polishing accelerator comprises an organic phosphonic acid; a method for manufacturing a substrate, comprising polishing a substrate to be polished with the above polishing composition; a method for polishing a substrate comprising polishing a substrate to be polished with the above polishing composition; a process for reducing fine scratches of a substrate, comprising polishing a substrate to be polished with the above polishing composition; and a process for accelerating polishing of a magnetic disk substrate, comprising applying the above polishing composition to a magnetic disk substrate to be polished. The polishing composition is highly suitable for polishing a magnetic disk substrate requiring high surface quality to be used in memory hard disk drives.

12 Claims, No Drawings

POLISHING COMPOSITION

BACKGROUND OF THE INVENTION

1. Field of the Invention

The present invention relates to a polishing composition, a method for manufacturing a substrate with the polishing composition, a method for polishing a substrate to be polished with the polishing composition, a process for reducing fine scratches of a substrate with the polishing composition, and a process for accelerating polishing of a magnetic disk substrate with the polishing composition.

2. Discussion of the Related Art

Recent memory hard disk drives have been demanded to have high areal density and small diameter. In order to increase the areal density, it has been strongly urged to lower flying height and to reduce the unit area of recording. Along with this trend, the surface quality required after polishing has become severely assessed every year even in a method for manufacturing a magnetic disk substrate. In order to meet the requirement of the low flying height, the disk surface is required to have reduced surface roughness, waviness, roll-off, and projections. In order to meet the requirement of the reduction of the unit area of recording, sizes and depth of permitted scratches and pits have become increasingly small.

Also, in the field of semiconductors, the trends of producing thinner wiring have been progressed along with the trends of highly integrated circuits and higher speed at the operating frequencies. Even in the method for manufacturing a semiconductor device, since the focal depth becomes shallow with the trend of thinning the wiring during the exposure of a photoresist, further smoothening of a pattern-forming surface has been desired.

In order to realize the surface quality described above in consideration of productivity, there has been proposed a process for increasing a polishing rate, wherein a colloidal silica is used as an abrasive to realize good surface quality, and various additives are added thereto (Japanese Patent Laid-Open Nos. Hei 11-246849 and 2000-42904). However, any of these methods do not achieve a satisfactory polishing rate.

Japanese Patent Laid-Open Nos. Hei 9-204657, Hei 10-226784, Hei 10-265766, and Hei 9-208934 each discloses the use of phosphonic acid in a polishing composition. However, the phosphonic acid used in these polishing compositions is used as a stabilizer for decomposition of an oxidizing agent such as hydrogen paroxide, or as a gelation inhibitor in a case where fumed silica is used. Therefore, effects of realizing high-quality surface and increasing polishing rate have not been known in these polishing compositions.

In addition, recently, as new surface defects, fine scratches having depth of 0.1 nm or more and less than 5 nm, a width of 10 $\mu$m or more and less than 50 $\mu$m, and a length of 10 $\mu$m or more and less than 1 mm have been found. When the fine scratches are reduced from the substrate, there are expected that excellent effects of stabilization of lowered flying height and reduction of missing pulse error are exhibited. However, in the conventional methods, the fine scratches could not be sufficiently reduced.

An object of the present invention is to provide a polishing composition used in final polishing of memory hard disk and polishing for semiconductor elements, having small surface roughness of a substrate after polishing, and being capable of polishing at a high speed economically for a long period of time, without generating surface defects such as projections and polishing scratches; a method for manufacturing a substrate with the polishing composition; a method for polishing a substrate to be polished with the polishing composition; a process for reducing fine scratches of a substrate; and a process for accelerating polishing of a magnetic disk substrate with the polishing composition.

These and other objects of the present invention will be apparent from the following description.

SUMMARY OF THE INVENTION

According to the present invention, there are provided:

[1] a polishing composition comprising an abrasive, an oxidizing agent, a polishing accelerator, and water, wherein the polishing accelerator comprises an organic phosphonic acid;

[2] a method for manufacturing a substrate, comprising polishing a substrate to be polished with the polishing composition of item [1];

[3] a method for polishing a substrate comprising polishing a substrate to be polished with the polishing composition of item [1];

[4] a process for reducing fine scratches of a substrate, comprising polishing a substrate to be polished with the polishing composition of item [1]; and

[5] a process for accelerating polishing of a magnetic disk substrate, comprising applying the polishing composition of item [1] to a magnetic disk substrate to be polished.

DETAILED DESCRIPTION OF THE INVENTION

As mentioned above, the polishing composition of the present invention comprises an abrasive, an oxidizing agent, a polishing accelerator, and water, wherein the polishing accelerator comprises an organic phosphonic acid. One of the great features of the present invention resides in the use of an organic phosphonic acid as a polishing accelerator. By the use of the organic phosphonic acid, there are some surprising findings such that the present invention is free from the problems in gelation and instability of the prior art using aluminum nitrate, which is a conventional polishing accelerator, and that the organic phosphonic acid also acts as a polishing accelerator, contrary to the conventional purpose of the phosphonic acid as a gelation inhibitor or stabilizer.

As the abrasive used in the present invention, any abrasives generally employed for polishing can be used. The abrasive includes, for instance, metals; carbides of metals or metalloids, nitrides of metals or metalloids, oxides of metals or metalloids, borides of metals or metalloids; diamond, and the like. The metals or metalloids include those elements belonging to the Groups 2A, 2B, 3A, 3B, 4A, 4B, 5A, 6A, 7A or 8A of the Periodic Table (long period form). Concrete examples of the abrasive include aluminum oxide, silicon carbide, diamond, magnesium oxide, zinc oxide, titanium oxide, cerium oxide, zirconium oxide, silica, and the like. It is preferable that one or more of these abrasives are used, from the viewpoint of increasing the polishing rate. As to the aluminum oxide, those have various crystal forms such as $\alpha$, $\theta$ and $\gamma$ have been known, which can be appropriately selected and used depending upon the applications. Among them, silica, cerium oxide, zirconium oxide, titanium oxide, and the like are suitable for polishing semiconductor wafers and semiconductor elements and substrates for precision parts such as substrates for magnetic recording media. Moreover, the silica, especially colloidal silica is preferable, from the viewpoints of being suitable for an application of finish-polishing of a magnetic disk substrate having high recording density memory and an application of polishing a semiconductor device substrate, which require a higher level of smoothness.

The abrasive has an average primary particle size of preferably from 0.001 to 3 μm, more preferably from 0.01 to 1 μm, still more preferably from 0.02 to 0.8 μm, especially preferably from 0.05 to 0.5 μm, from the viewpoint of increasing the polishing rate. Further, when the primary particles are aggregated to form a secondary particle, the abrasive has an average secondary particle size of preferably from 0.05 to 3 μm, more preferably from 0.1 to 1.5 μm, especially preferably from 0.2 to 1.2 μm, from the viewpoint of similarly increasing the polishing rate and from the viewpoint of reducing the surface roughness of an object to be polished. The average primary particle size of the abrasive can be determined by carrying out image analysis by observation with a scanning electron microscope (magnification: preferably from 3000 to 30000 times) to determine an arithmetic means of width and length of particle. In addition, the average secondary particle size can be determined as a volume-average particle size by using a laser beam diffraction method.

In addition, in the present invention, it is more preferable to use silica particles as an abrasive, from the viewpoints of reducing the surface roughness (Ra, Rmax) and the waviness (Wa), and reducing the surface defects such as scratches, thereby improving the surface quality. The silica particles include colloidal silica particles, fumed silica particles, surface-modified silica particles, and the like, among which the colloidal silica particles are preferable. Here, the colloidal silica particles can be obtained by, for instance, a process comprising generating silica particles from an aqueous silicic acid.

The average primary particle size of the silica particles is preferably 0.001 μm or more, more preferably 0.01 μm or more, still more preferably 0.02 μm or more, from the viewpoint of increasing the polishing rate, and the average primary particle size is preferably 0.6 μm or less, more preferably 0.5 μm or less, still more preferably 0.3 μm or less, especially preferably 0.2 μm or less, from the viewpoints of reducing the surface roughness (Ra, Rmax) and the waviness (Wa). The average primary particle size is preferably from 0.001 to 0.6 μm, more preferably from 0.001 to 0.5 μm, still more preferably from 0.01 to 0.3 μm, especially preferably from 0.02 to 0.2 μm. Here, the particle size can be determined by carrying out image analysis by observation with a scanning electron microscope (magnification: preferably from 3000 to 100000 times) to determine an arithmetic means of width and length of particle.

Further, as the particle size distribution of the silica particles, those exemplified below are preferable.

(1) a ratio of D90/D50 is from 1.3 to 3.0, and D50 is from 10 to 600 nm, wherein D90 is defined as a particle size at 90% counted from a smaller size side on a number base in a cumulative particle size distribution, and wherein D50 is defined as a particle size at 50% counted from a smaller size side on a number base in a cumulative particle size distribution.

In the present invention, by using the polishing composition comprising silica particles having the particle size distribution shown in item (1) above, there are exhibited such effects that the surface roughness of the substrate is made small after polishing, and that the substrate to be polished can be polished at an economical speed without generating surface defects such as projections and polishing damages.

In the particle size distribution shown in item (1) above, D90/D50 is preferably from 1.3 to 3.0, more preferably from 1.3 to 2.0, from the viewpoints of preventing the generation of scratches, and reducing the surface roughness (Ra, Rmax), thereby accomplishing smoother and excellent surface quality, and from the viewpoint of accomplishing a high polishing rate. In addition, D90/D50 is preferably 1.3 or more, from the viewpoint of accomplishing a high polishing rate, and D90/D50 is preferably 3.0 or less, from the viewpoints of maintaining a high polishing rate and obtaining excellent surface smoothness.

In the particle size distribution shown in item (1) above, D50 is from 10 to 600 nm, preferably from 30 to 200 nm, especially preferably from 40 to 100 nm. D50 is preferably 10 nm or more, from the viewpoint of increasing a high polishing rate, and D50 is preferably 600 nm or less, from the viewpoints of preventing the generation of surface defects such as scratches and obtaining excellent surface smoothness.

In addition, in the silica particles having the particle size distribution shown in item (1) above, in order to obtain a substrate at a high polishing rate and have excellent surface smoothness, it is preferable that D10 is preferably from 5 to 100 nm, more preferably from 15 to 85 nm, still more preferably from 35 to 70 nm, especially preferably from 40 to 60 nm, wherein D10 is defined as a particle size at 10% counted from a smaller size side on a number base in a cumulative particle size distribution. D10 is preferably 5 nm or more, from the viewpoint of increasing a high polishing rate, and D10 is preferably 100 nm or less, from the viewpoint of maintaining excellent surface smoothness.

Incidentally, the particle size distribution shown in item (1) above is a particle size distribution of overall silica particles. For instance, as the silica particles having the particle size distribution shown in item (1) above, two or more types of silica particles may be used in combination. In this case, each of the particle size distributions mentioned above (D10, D50, D90) is determined for the admixed silica particles.

Among them, when the silica particles comprise two or more types of silica particles of which D50s are different from each other, those having the following particle size distribution prior to mixing are preferable.

(2) a ratio of D50L to D50S (D50L/D50S) is from 1.1 to 4.0, and a weight ratio of A to B (A/B) is from 90/10 to 10/90, wherein D50L is defined as D50 of silica particles (B) having the largest D50, and D50S is defined as D50 of silica particles (A) having the smallest D50.

One of the great features of the present invention resides in that the silica particles comprise two or more types of silica particles of which D50s are different from each other, each of the silica particles having the particle size distribution as shown in item (2) above. By using a polishing composition comprising the silica particles, there are advantages that the surface roughness of the substrate is small after polishing, and polishing of the substrate to be polished can be carried out without generating surface defects such as projections and polishing damages, whereby especially an excellent polishing rate is obtained. Here, when three or more types of silica particles of which D50s are different from each other, D50 of the silica particles having the smallest D50 is referred to as "D50S," and D50 of the silica particles having the largest D50 is referred to as "D50L."

In the particle size distribution as shown in item (2) above, D50L/D50S is preferably from 1.1 to 4.0, more preferably from 1.1 to 3.0, still more preferably from 1.5 to 3.0. D50L/D50S is preferably 1.1 or more, from the viewpoint of increasing the polishing rate, and D50L/D50S is preferably 4.0 or less, from the viewpoints of maintaining a high polishing rate, and maintaining excellent surface smoothness, without generating surface defects such as scratches. In the particle size distribution as shown in item (2) above, it is preferable that the mixing ratio of two or more types of the silica particles is such that the ratio of D90 to D50 (D90/D50) in the particle size distribution of the particles after mixing satisfies from 1.3 to 3.0, and that D50, i.e. D50L and D50S, is from 10 to 600 nm, more preferably from 30 to 200 nm, especially preferably from 40 to 100 nm. Further, it is preferable that D10 in the particle size distribution of the particles after mixing is from 5 to 100 nm. Incidentally, the mixing weight ratio of A to B (A/B) is preferably from 90/10 to 10/90, more preferably from 90/10 to 20/80, still more preferably from 85/15 to 35/65, wherein A is defined as silica particles having the smallest D50 and B is defined as silica particles having the largest D50.

In the silica particles having the particle size distribution as shown in item (2) above, so long as the silica particles used have two or more types of D50s which are different from each other, the kinds of the individual silica particles may be identical or different. Here, D50L and D50S mentioned above are each determined prior to mixing.

Further, it is preferable that the silica particles have a particle size distribution shown below:
(3) a percentage at 40 nm counted from a smaller size side on a number base in a cumulative particle size distribution is 25% or less, and D50 is from 50 to 600 nm.

One of the great features of the present invention resides in that the silica particles have the particle size distribution as shown in item (3) above. By using a polishing composition comprising the silica particles having the particle size distribution, there is exhibited such an effect that the silica particles can be readily cleaned from the surface of the substrate to be polished by ordinary cleaning. In addition, in the cleaning process after polishing, there are exhibited some effects that the surface smoothness of the substrate can be maintained, and that polishing can be carried out at economical polishing rate without generation of surface defects.

In the particle size distribution as shown in item (3) above, it is desired that the percentage at 40 nm counted from a smaller size side on a number base in a cumulative particle size distribution is 25% or less, preferably 15% or less, more preferably 10% or less, still more preferably 5% or less, especially preferably 3% or less, from the viewpoint of reducing the amount of the silicate particles remaining on the substrate after polishing. In order to adjust the percentage at 40 nm counted from a smaller particle size side on a number base in a cumulative particle size distribution to 25% or less, for instance, the content of the silica particles having a particle size of 40 nm or less may be made low. As a process for lowering the content of the silica particles of which particle size is 40 nm or less, for instance, a colloidal silica having a low content of particles having a small particle size can be prepared by controlling the addition rate of an active sol during the synthesis of colloidal silica in which silica sol is allowed to grow as a core. In addition, there would be no problem to, for instance, classify a colloidal silica comprising particles having a small particle size with a centrifuge or the like.

On the other hand, D50 is preferably from 50 to 600 nm, more preferably from 50 to 200 nm, still more preferably from 50 to 150 nm, from the viewpoint of accomplishing economic polishing rate, and from the viewpoint of having excellent surface smoothness, thereby accomplishing excellent surface quality without surface defects.

In addition, it is preferable that the ratio of D90 to D50 (D90/D50) is from 1.3 to 3.0, more preferably from 1.3 to 2.0, from the viewpoints of accomplishing a high polishing rate, and having excellent surface smoothness, thereby accomplishing excellent surface quality without surface defects.

As the silica particles having the particle size distribution shown in item (3) above, two or more types of silica particles may be used in combination. In this case, each of the particle size distributions shown in item (3) above is determined for the admixed silica particles.

In addition, it is preferable that the silica particles used in the present invention are those satisfying two or more conditions selected from items (1) to (3) above, and especially it is more preferable that the silica particles are those satisfying all these conditions.

The particle size of the silica particles in any of items (1) to (3) above can be determined by the following method using a scanning electron microscope (hereinafter simply referred to as SEM). Specifically, a polishing composition comprising silica particles is diluted with ethanol so that the silica particle concentration is 0.5% by weight. The diluted suspension is evenly applied to a sample plate for SEM heated to about 50° C. Thereafter, excess suspension is wiped off by a filter paper, and the coat is evenly air-dried so that the suspension is not aggregated.

Pt-Pd is deposited on the air-dried silica particles. Using a field emission scanning electron microscope (FE-SEM: Model S-4000) manufactured by Hitachi LTD., of which magnification is adjusted to 3000 to 100000 times so that about 500 silica particles can be observed within the scope, two pinpoints per one sample plate are observed and a microphotograph is taken thereat. Each microphotograph taken (10.16 cm×12.7 cm) is enlarged to an A4 size (210 mm×297 mm) by a copy machine or the like, and the particle sizes of all the photographed silica particles are determined by calipers or the like and the data are summed up. The procedures are repeated for several runs, so that the number of silica particles to be determined is 2000 or more. It is more preferable that the number of determination points by SEM is increased, from the viewpoint of obtaining an accurate particle size distribution. The particle size distribution on a number base in the present invention can be obtained by summing up data for the determined particle sizes and adding its frequency (%) from a smaller particle size, with defining a particle size at 10% cumulative frequency as D10, a particle size at 50% cumulative frequency as D50, and a particle size at 90% cumulative frequency as D90. The particle size distribution as referred to herein is obtained as the particle size distribution of the primary particle, with proviso that when secondary particles in which primary particles of aluminum oxide, cerium oxide, fumed silica or the like are fused to each other are present, the particle size distribution can be obtained on the basis of the particle size of the secondary particle size thereof.

In addition, the method for adjusting the particle size distribution of the silica particles is not particularly limited. For instance, in the case where the silica particles are colloidal silica particles, the adjustment for the particle size distribution can be accomplished by a method comprising adding a new particle acting as a core in the growth method of the particle during the preparation stage, to give a final product allowed to have a particle size distribution; a method of mixing two or more types of silica particles of which particle size distributions are different from each other; and the like.

The content of the silica particles is preferably 0.5% by weight or more, more preferably 1% by weight or more, still more preferably 3% by weight or more, especially preferably 5% by weight or more, of the polishing composition, from the viewpoint of increasing the polishing rate, and the content of the silica particles is preferably 50% by weight or less, more preferably 40% by weight or less, still more preferably 30% by weight or less, especially preferably 25% by weight or less, of the polishing composition, from the viewpoint of improving the surface quality and from the viewpoint of economic advantages.

In other words, the content is preferably from 0.5 to 50% by weight, more preferably from 1 to 40% by weight, still more preferably from 3 to 30% by weight, especially preferably from 5 to 25% by weight.

The oxidizing agent includes, peroxides, permanganic acid or salts thereof, chromic acid or salts thereof, nitric acid or salts thereof, peroxo acid or salts thereof, oxyacid or salts thereof, metal salts, sulfuric acid, and the like.

More concretely, the peroxide includes hydrogen peroxide, sodium peroxide, barium peroxide, and the like; the permanganic acid or salts thereof include potassium permanganate, and the like; the chromic acid or salts thereof includes metal salts of chromic acid, metal salts of dichromic acid, and the like; the nitric acid or salts thereof includes iron (III) nitrate, ammonium nitrate, and the like; the peroxo acid or salts thereof includes peroxodisulfric acid, ammonium peroxodisulfate, metal salts of peroxodisulfuric acid, peroxophosphoric acid, peroxosulfuric acid, sodium peroxoborate, performic acid, peracetic acid, perbenzoic acid, perphthalic acid, and the like; oxyacid or salts thereof includes hypochlorous acid, hypobromous acid, hypoiodous acid, chloric acid, bromic acid, iodic acid, perchloric acid, sodium hypochlorate, calcium hypochlorate, and the like; metal salts includes iron (III) chloride, iron (III) sulfate, iron (III) citrate, ammonium iron (III) sulfate, and the like. The preferred oxidizing agent is hydrogen peroxide, iron (III) nitrate, peracetic acid, ammonium iron (III) peroxodisulfate, and ammonium iron (III) sulfate. Especially, hydrogen peroxide is preferable, from the viewpoints of being widely used and inexpensive without depositing metal ions. These oxidizing agents can be used alone or in admixture of two or more kinds.

The content of the oxidizing agent is preferably 0.002% by weight or more, more preferably 0.005% by weight or more, still more preferably 0.007% by weight or more, especially preferably 0.01% by weight or more, of the polishing composition, from the viewpoint of increasing the polishing rate. Also, the content is preferably 20% by weight or less, more preferably 15% by weight or less, still more preferably 10% by weight or less, especially preferably 5% by weight or less, of the polishing composition, from the viewpoints of reducing the surface roughness and the waviness, and reducing the surface defects such as pits and scratches, thereby improving the surface quality, and from the viewpoint of economic advantages. The content is preferably from 0.002 to 20% by weight, more preferably from 0.005 to 15% by weight, still more preferably from 0.007 to 10% by weight, especially preferably from 0.01 to 5% by weight, of the polishing composition.

In the present invention, the polishing composition comprises an organic phosphonic acid as a polishing accelerator. Since the polishing composition comprises the organic phosphonic acid, there are exhibited some remarkable effects that the surface quality of the substrate is improved, that polishing can be carried out at a higher rate, and further that polishing can be carried out at a higher rate for a long period of time. As the organic phosphonic acid, those having molecular weight of 150 or more, more preferably 200 or more, are preferred, from the viewpoint of improving the surface quality. The number of phosphonate groups in the organic phosphonic acid is preferably 2 or more, from the viewpoint of increasing the polishing rate. Concrete examples of the organic phosphonic acid are phosphonic acids such as 1-hydroxyethylidene-1,1-diphosphonic acid, aminotri(methylenephosphonic acid), ethylenediaminetetra (methylenephosphonic acid), diethylenetriaminepenta (methylenephosphonic acid), ethane-1,1-diphosphonic acid, ethane-1,1,2-triphosphonic acid, ethane-1-hydroxy-1,1-diphosphonic acid, ethane-1-hydroxy-1,1,2-triphosphonic acid, ethane-1,2-dicarboxy-1,2-diphosphonic acid, and methanehydroxyphosphonic acid, alkali metal salts thereof or alkanolamine salts thereof; phosphonocarboxylic acids such as 2-phosphonobutane-1,2-dicarboxylic acid, 1-phosphonobutane-2,3,4-tricarboxylic acid, and α-methylphosphonosuccinic acid, alkali metal salts thereof or alkanolamine salts thereof, aminopoly (methylenephosphonic acid), alkali metal salts thereof or alkanolamine salts thereof, and the like. Among them, 1-hydroxyethylidene-1,1-diphosphonic acid, aminotri (methylenephosphonic acid), ethylenediaminetetra (methylenephosphonic acid), diethylenetriaminepenta (methylenephosphonic acid), or salts thereof are preferable.

It is desired that the content of the organic phosphonic acid is 5% by weight or less, preferably 3% by weight or less, more preferably 2% by weight or less, still more preferably 1% by weight or less, especially preferably 0.5% by weight or less, of the polishing composition, from the viewpoint of reducing the fine scratches. Also, it is desired that the content is from 0.0001 to 5% by weight, preferably from 0.001 to 3% by weight, more preferably from 0.001 to 2% by weight, still more preferably from 0.01 to 2% by weight, especially preferably from 0.01 to 1% by weight, most preferably from 0.2 to 0.5% by weight, of the polishing composition, from the viewpoint of exhibiting a sufficient polishing rate and from the viewpoint of improving the surface quality.

The term "fine scratches" as referred to herein refers to those scratches having depth of 0.1 nm or more and less than 5 nm, a width of 10 μm or more and less than 50 μm, and a length of 10 μm or more and less than 1 mm.

The polishing composition has an acid value of preferably 20 mg KOH/g or less, more preferably 10 mg KOH/g or less, still more preferably 5 mg KOH/g or less, especially preferably 3 mg KOH/g or less, from the viewpoint of reducing the fine scratches. In addition, the polishing composition has an acid value of preferably 0.2 mg KOH/g or more, more preferably 0.5 mg KOH/g or more, still more preferably 0.75 mg KOH/g or more, especially preferably 1.0 mg KOH/g or more, from the viewpoint of increasing the polishing rate.

The acid value is determined by the method according to JIS K 1557, and defined as an amount (mg) of potassium hydroxide required for neutralizing 1 g of the polishing composition.

Water in the polishing composition of the present invention is used as a medium. From the viewpoint of efficiently polishing the substrate to be polished, the water content is preferably 50% by weight or more, more preferably 60% by weight or more, still more preferably 70% by weight or more, especially preferably 80% by weight or more, of the polishing composition, and the water content is preferably 99.4979% by weight or less, more preferably 98.994% by weight or less, still more preferably 96.983% by weight or less, especially preferably 94.79% by weight or less, of the polishing composition. The water content is preferably from 50 to 99.4979% by weight, more preferably from 60 to 98.994% by weight, still more preferably from 70 to 96.983% by weight, especially preferably from 80 to 94.79% by weight.

The concentration of each component of the above-mentioned polishing composition may be any of the concentration during the preparation of the composition and the concentration upon use. In many cases, the composition is usually prepared as a concentrate, which is diluted upon use.

In addition, there can be added other component to the polishing composition of the present invention as occasion demands. The other component includes metal salts or ammonium salts of a monomeric form of acid compounds, thickeners, dispersing agents, anticorrosive agents, basic substances, surfactants, and the like.

The polishing composition of the present invention can be prepared by mixing the abrasive, the oxidizing agent, the organic phosphonic acid, and water, and, as occasion demands, other components thereto by a known process.

It is preferable that the pH of the polishing composition of the present invention is appropriately determined depending upon the kinds of the objects to be polished and the required properties. For instance, the pH of the polishing composition of the present invention is preferably from 1.8 to 12, more preferably from 3 to 10, from the viewpoint of corrosiveness of working machines and from the viewpoint of the safety of the workers. In addition, although the pH of the polishing composition cannot be absolutely determined because it differs depending upon the materials of the objects to be polished, it is desirable that the pH is generally 6.5 or less, preferably less than 6.0, more preferably 5.9 or less, still more preferably 5.5 or less, still more preferably 5 or less, especially preferably 4 or less, from the viewpoint of increasing the polishing rate, and that the pH is 7.5 or more, preferably 8.0 or more, more preferably 9 or more, from the viewpoint of increasing the polishing rate. Especially in the substrate for precision parts mainly made of a metal such as an aluminum alloy substrate manufactured by nickel-phosphorus (Ni—P) plating, it is preferable that the pH shows acidic, and that the pH is 6.5 or less, preferably less than 6.0, more preferably 5.9 or less, still more preferably 5.5 or less, still more preferably 5 or less, especially preferably 4 or less, from the viewpoint of increasing the polishing rate. Further, when the polishing composition is used for polishing a semiconductor wafer, a semiconductor element, or the like, especially for polishing a silicone substrate, a polysilicone layer, or an $SiO_2$ layer, the pH of the polishing composition is preferably from 7 to 12, more preferably from 8 to 12, especially preferably from 9 to 12, from the viewpoints of increasing the polishing rate and improving the surface quality. In addition, it is preferable that the pH shows basic, and that the pH is 7.5 or more, preferably 8 or more, more preferably 9 or more, from the viewpoint of improving the dispersibility of the silica particles, thereby improving the surface quality. In addition, the pH is preferably neutral, from the viewpoint of reducing the abrasive grain residue in the cleaning after polishing. Therefore, although the pH may be set in accordance with the purpose which is to be considered important, especially in the substrate for precision parts mainly made of a metal such as an aluminum alloy substrate manufactured by Ni—P plating, the pH is preferably from 1.8 to 5.5, from the total viewpoints mentioned above. The pH can be adjusted by properly adding an inorganic acid such as nitric acid or sulfuric acid, an ammonium salt, a basic substance such as an aqueous ammonia, potassium hydroxide, sodium hydroxide or an amine in a desired amount.

The method for polishing a substrate of the present invention comprises polishing a substrate to be polished with the polishing composition of the present invention, or with a mixture in which each component is mixed so as to give the composition of the polishing composition of the present invention, and the polishing method can be especially suitably used for the production of a substrate for precision parts. In addition, the polishing composition of the present invention has an excellent storage stability, and can stably exhibit polishing properties for a long period of time.

The material for the substrate to be polished by the polishing composition of the present invention includes, for instance, metals or metalloids such as silicon, aluminum, nickel, tungsten, copper, tantalum and titanium, and alloys thereof, glassy substances such as glass, glassy carbon and amorphous carbons; ceramic materials such as alumina, silicon dioxide, silicon nitride, tantalum nitride, and titanium carbide; resins such as polyimide resins; and the like. Among them, a substrate to be polished is preferably made of a metal such as aluminum, nickel, tungsten or copper, or made of an alloy containing these metals as the main components; or a substrate to be polished preferably contains these metals as in semiconductive substrates made of semiconductive elements. For instance, an aluminum alloy substrate plated with Ni—P or a glass substrate such as crystallized glass or reinforced glass is more preferable, and the aluminum alloy substrate plated with Ni—P is especially preferable.

The shape for the substrate to be polished is not particularly limited. For instance, those having shapes containing planar portions such as discs, plates, slabs and prisms, or shapes containing curved portions such as lenses can be subjects for polishing with the polishing composition of the present invention. Among them, those having the disc-shaped substrates are especially preferable in polishing.

The polishing composition of the present invention can be favorably used in polishing the substrate for precision parts. For instance, the polishing composition is suitable for polishing substrates for precision parts such as substrates for magnetic recording media such as magnetic disks, optical disks, opto-magnetic disks, and the like; photomask substrates, optical lenses, optical mirrors, optical prisms and semiconductive substrates. The polishing of the semiconductive substrates comprises the steps of polishing a silicon wafer (bare wafer), forming separation layer for an embedding element, flattening an interlayer dielectric film, forming an embedded metal line, and forming embedded capacitor, and the like. The polishing composition of the present invention is especially suitable for polishing a magnetic disk substrate. Further, the polishing composition is suitable for obtaining a magnetic disk substrate having a surface roughness (Ra) of 0.3 nm or less and a waviness (Wa) of 0.3 nm or less.

In the present specification, the surface roughness (Ra) and the waviness (Wa) are determined as so-called average deviation, of all points from a plane fit to the test part surface. The average deviation, of all points from a plane fit to the test part surface obtained from a roughness curve having a wave length component of 80 μm or less is expressed as Ra, and the average deviation, of all points from a plane fit to the test part surface obtained from a waviness curve having a wave length component of 0.4 to 5 mm is expressed as Wa. Wa is an average deviation, of all points from a plane fit to the microwaviness data. These Ra and Wa can be determined as follows:

[Average Deviation, of All Points from Plane Fit to Test Part Surface: Ra]

Determined under the following conditions using Talystep (TalyData 2000) manufactured by Rank Taylor-Hobson Limited.

| Size of Tip End of Profilometer: | 2.5 μm × 2.5 μm |
|---|---|
| By-pass Filter: | 80 μm |
| Measurement Length: | 0.64 mm |

[Average Deviation, of All Points from Plane Fit to Microwaviness Data: Wa]

Determined under the following conditions using New View 200 manufactured by Zygo.

| Object Lens: | Magnification, 2.5 times |
|---|---|
| Image Zoom: | Magnification, 0.5 times |
| Filter: | Band Pass |
| Filter type: | FFT Fixed |
| Filter High Wavelength: | 0.4 mm |
| Filter Low Wavelength: | 5.0 mm |
| Remove: | Cylinder |

The polishing method using the polishing composition of the present invention includes, for instance, a polishing method comprising clamping a substrate with polishing disks to which a polishing cloth made of nonwoven organic polymer fabric, is pasted; feeding a polishing composition to a polishing surface; and moving the polishing disks or the substrate, with applying a given pressure. In the polishing method of the present invention, by using the polishing composition of the present invention, there can be exhibited such effects that the polishing rate is increased, that the generation of surface defects such as scratches and pits is suppressed, and that the surface smoothness such as surface roughness (Ra) and waviness (Wa) can be improved. Especially according to the polishing method of the present invention, the fine scratches of the substrate can be reduced. Therefore, the present invention relates to a process for reducing fine scratches of a substrate.

The method for manufactuing a substrate of the present invention comprises polishing a substrate to be polished with the above-mentioned polishing composition. In the method, it is preferable that the polishing method of the present invention is carried out in a second step or subsequent steps among the plural polishing steps, and it is especially preferable that the polishing method of the present invention is carried out in the final polishing step. For instance, the aluminum alloy substrate obtained in a single-step or two-step polishing method, which is Ni—P plated to have a surface roughness (Ra) of from 0.5 to 1.5 nm and a waviness (Wa) of from 0.5 to 1.0 nm, is polished by the polishing step using the polishing composition of the present invention, whereby a magnetic disk substrate having a surface roughness (Ra) of 0.3 nm or less and a waviness (Wa) of 0.3 nm or less, preferably a magnetic disk substrate having a surface roughness (Ra) of 0.25 nm or less and a waviness (Wa) of 0.25 nm or less, can be manufactured. Especially, the polishing composition of the present invention is suitably used for the second step in the two-step polishing method during the manufacturing of the magnetic disk substrate having a surface roughness (Ra) of 0.3 nm or less and a waviness (Wa) of 0.3 nm or less, preferably a magnetic disk substrate having a surface roughness (Ra) of 0.25 nm or less and a waviness (Wa) of 0.25 nm or less.

The magnetic disk substrate thus manufactured is excellent in the surface smoothness. As the surface smoothness, it is desired that the surface smoothness (Ra) is 0.3 nm or less, preferably 0.25 nm or less. In addition, it is desired that the waviness (Wa) is 0.3 nm or less, preferably 0.25 nm or less.

As described above, by using the polishing composition of the present invention, the polishing rate can be increased, and at the same time there can be efficiently manufactured a high-quality magnetic disk substrate having excellent surface properties such that there are little surface defects such as scratches, fine scratches and pits, and the surface smoothness such as surface roughness (Ra) and waviness (Wa), is improved. Especially, the polishing rate can be improved, and at the same time there can be efficiently manufactured a high-quality magnetic disk substrate having excellent surface properties such that the surface smoothness such as waviness (Wa) is improved.

In addition, by using the polishing composition of the present invention for polishing a magnetic disk substrate, as described above, the polishing rate is increased, so that the fine scratches on the substrate can be reduced and that the surface smoothness can be improved, whereby accelerating polishing. Therefore, the present invention relates to a process for accelerating polishing of a magnetic disk substrate.

The polishing composition of the present invention is especially effective in the polishing method, and the polishing composition can be similarly applied to polishing steps other than the polishing method, for instance, lapping method, and the like.

EXAMPLES (Object to Be Polished)

Each of the resulting polishing compositions was evaluated for its polishing properties by using an Ni—P plated, aluminum alloy substrate having a surface roughness Ra of 1 nm, a thickness of 0.8 mm, and a diameter of 95 mm as a substrate to be polished. The substrate was roughly polished with a polishing liquid containing alumina abrasives. The polishing conditions and the evaluation methods are as follows.

Examples 1 to 6

As shown in Table 1, 7 parts by weight of colloidal silica (D10: 45 nm, D50: 58 nm, D90: 90 nm), 1 part by weight (pure content) of 35% hydrogen peroxide (manufactured by ASAHI DENKA KOGYO K. K.), and any one of the following aids A to D in a given amount shown in Table 1 were mixed together, and water was added thereto to make up a total amount of 100 parts by weight of a polishing composition. Among the polishing compositions, those of Examples 5 and 6 were adjusted to a pH of 2.0 with 61% nitric acid (Wako Pure Chemical, Special Grade). The colloidal silica used in Examples 1 to 6 and the following Comparative Examples 1 to 7 is a mixture of 65% by weight of a colloidal silica having D50 of 55 nm and D90 of 65 nm, and 35% by weight of a colloidal silica having D50 of 80 nm and D90 of 100 nm.

The order of mixing was such that the aid was gradually added to a mixture prepared by diluting a colloidal silica slurry with water, with stiring, carefully attending not to cause gelation of the slurry. Thereafter, hydrogen peroxide was finally gradually added thereto in a given amount, with stirring.

Aid A: 1-Hydroxyethylidene-1,1-diphosphonic acid
Aid B: Aminotrimethylene phosphonic acid
Aid C: Pentasodium diethylenetetraminepentamethylene phosphonate
Aid D: Heptasodium hexamethylenediaminetetramethylene phosphonate

TABLE 1

| | Composition (parts by weight) | | | | | | |
|---|---|---|---|---|---|---|---|
| | Colloidal Silica | Hydrogen Peroxide | Aid A | Aid B | Aid C | Aid D | pH |
| Ex. 1 | 7.0 | 1.0 | 0.45 | — | — | — | 2 |
| Ex. 2 | 7.0 | 1.0 | 0.40 | — | — | — | 2 |
| Ex. 3 | 7.0 | 0.3 | 0.40 | — | — | — | 2 |
| Ex. 4 | 7.0 | 1.0 | — | 0.45 | — | — | 2 |
| Ex. 5 | 7.0 | 1.0 | — | — | 0.45 | — | 2 |
| Ex. 6 | 7.0 | 1.0 | — | — | — | 0.45 | 2 |

COMPARATIVE EXAMPLES 1 to 7

As shown in Table 2, colloidal silica (D10: 45 nm, D50: 58 nm, D90: 90 nm), 35% hydrogen peroxide (manufactured by ASAHI DENKA KOGYO K. K.) and any one of the aids A, B, E to G in given amounts shown in Table 2 were mixed together, and water was added thereto to make up a total amount of 100 parts by weight of a polishing composition. Here, the aids E to G were those shown below. Among the polishing compositions, that of Comparative Example 7 was adjusted to a pH of 2.5 with 61% nitric acid (Wako Pure Chemical, Special Grade).

The order of mixing was such that the aid was gradually added to a mixture prepared by diluting a colloidal silica slurry with water, with stirring, carefully attending not to cause gelation of the slurry. For those containing hydrogen peroxide, the hydrogen peroxide was finally added thereto.

Aid E: Phosphonic acid (HP=O(OH)$_2$: phosphorous acid)
Aid F: Aluminum nitrate▽nonahydrate
Aid G: Ammonium oxalate▽monohydrate Each of the polishing compositions obtained in Examples 1 to 6 and Comparative Examples 1 to 7 was evaluated for the polishing rate, the surface roughness, the waviness, the surface defects, the presence of scratches, the fine scratches, the acid value and the storage stability based on the following methods. The results are shown in Tables 3 and 4.

(Polishing Conditions)
Polishing testing machine: double-sided processing machine, Model 9B, manufactured by SPEEDFAM CO., LTD.
Polishing pad: "Belatrix N0058" (manufactured by Kanebo, LTD.).
Disc rotational speed: 35 r/min
Feeding rate for a slurry: 40 mL/min
Polishing time period: 4 minutes
Polishing load: 7.8 kPa
Number of substrates introduced: 10

(Polishing Rate)
The polishing rate was determined from a weight loss of each aluminum alloy substrate before and after polishing.

(Surface Roughness (Ra, Rmax))
Each of the back surface of the polished surface was observed by an atomic force microscope (commercially available from Digital Instruments, "Nanoscope III") for a total of 6 points, in each of 3 points at every 120° within the scope of 2 μm×2 μm at a scan rate of 1.0 Hz, and an average value was taken. The evaluation criteria are as follows:
(Ra)
○: Less than 3.5 Å (0.35 nm)
x: 3.5 Å (0.35 nm) or more
(Rmax)
⊚: Less than 40 Å (4.0 nm)
Δ: 40 Å (4.0 nm) or more and less than 100 Å (10.0 nm)
x: 100 Å (10.0 nm) or more
The results are shown in Table 3.
Here, "Ra" refers to average deviation, of all points from a plane fit to the test part surface, and "Rmax" refers to P-V value (Peak-Valley value).

(Waviness (Wa))
The waviness was determined under the conditions described above using a device commercially available from Zygo.
The evaluation criteria are as follows:
○: Less than 4.5 Å (0.45 nm)
x: 4.5 Å (0.45 nm) or more
The results are shown in Table 3.

TABLE 2

| | Composition (parts by weight) | | | | | | | |
|---|---|---|---|---|---|---|---|---|
| | Colloidal Silica | Hydrogen Peroxide | Aid A | Aid B | Aid E | Aid F | Aid G | pH |
| Comp. Ex. 1 | 7.0 | 1.0 | — | — | — | — | — | 6.2 |
| Comp. Ex. 2 | 7.0 | — | 0.45 | — | — | — | — | 2 |
| Comp. Ex. 3 | 7.0 | — | — | 0.45 | — | — | — | 2 |
| Comp. Ex. 4 | 7.0 | 1.0 | — | — | 0.45 | — | — | 2 |
| Comp. Ex. 5 | 7.0 | — | 0.45 | — | — | 1.0 | — | 1.9 |
| Comp. Ex. 6 | 7.0 | 1.0 | — | — | — | 1.0 | — | 2.3 |
| Comp. Ex. 7 | 7.0 | 1.0 | — | — | — | — | 1.0 | 2.5 |

(Surface Defects (Fine Defects))
Each of the substrate surface was observed with a differential interference microscope with a magnification of 200 times at 12 locations at 30° intervals. The number of pits and projections per 12 scopes was counted.
The evaluation criteria are as follows:
◯: 0 pits or projections
x: one or more pits or projections
The results are shown in Table 3.
(Scratches)
Each of the substrate surface was observed with a differential interference microscopic system with a magnification of 200 times at 12 locations at 30° intervals. The number of scratches (length of 1 mm or more) per 12 scopes was counted.
The evaluation criteria are as follows:
◯: scratches
x: one or more scratches
The results are shown in Table 3.

(Fine Scratches)
Entire surfaces of 10 substrates were observed with a differential interference microscopic system (metallographic microscope: BX60M (commercially available from OLYMPUS OPTICAL COMPANY LIMITED), objective lens: UMPlan FI 5x/0.15 BD P, CCD color camera: ICD-500AC (commercially available from IKEGAMI TSUSHINKI CO., LTD.), color monitor: UCM-1000 REV. 8 (commercially available from IKEGAMI TSUSH CO., LTD.)), and the number of substrates out of 10 substrates in which fine scratches (depth: 0.1 nm or more and less than 5 nm, width: 10 μm or more and less than 50 μm, and length: 10 μm or more and less than 1 mm) were generated was counted. The results are shown in Table 3.
(Determination of Acid Value)
In a 100 mL collection vial about 50 g of a polishing liquid was weighed with a balance (BP221S, commercially available from Sartorius), and placed, and recorded to a fourth decimal place. Next, pH was determined with a pH meter (HM-30G, manufactured by Toa Denpa Kogyo, electrode: GST-5721C) with 3-point corrections (pH =4.01 (25° C.: phthalate pH standard solution, commercially available from Toa Denpa Kogyo), pH=6.86 (25° C.: neutral phosphate, commercially available from Toa Denpa Kogyo), pH=9.18 (25° C.: borate pH standard solution, commercially available from KATAYAMA CHEMICAL, INC.)), with stirring with a stirrer made of Teflon. Thereto was added dropwise a 0.1 mol/L aqueous potassium hydroxide (factor 1.000, commercially available from Sigma-Aldrich, Japan) using a 10 ml titration tube, and the amount (mL) showing pH of 7.00 was determined (usually calculated by interpolation from 4 data points around pH of 7.00). The amount of potassium hydroxide required for neutralizing 1 gram of a polishing liquid was calculated from the amount of the polishing liquid (g) and the amount of potassium hydroxide required (mL), and this was defined as an acid value (mg KOH/g). The acid values for Examples 1 to 6 and Comparative Examples 1 to 7 are shown in Table 3.

(Storage Stability)
The storage stability was evaluated from the polishing rates immediately after the preparation of the polishing composition, two weeks after the preparation, one month after the preparation, and three months after the preparation. The results are shown in Table 4.

TABLE 3

|  | Polishing Rate (μm/min) | Ra (AFM) | Rmax (AFM) | Wa (Zygo) | Fine Defects | Scratches | Fine Scratches (Substrate/ Substrate) | Acid Value (mgKOH/g) |
|---|---|---|---|---|---|---|---|---|
| Ex. No. | | | | | | | | |
| 1 | 0.13 | ◯ | ⊚ | ◯ | ◯ | ◯ | 0/10 | 2.9 |
| 2 | 0.13 | ◯ | ⊚ | ◯ | ◯ | ◯ | 0/10 | 2.6 |
| 3 | 0.13 | ◯ | ⊚ | ◯ | ◯ | ◯ | 0/10 | 2.6 |
| 4 | 0.12 | ◯ | ⊚ | ◯ | ◯ | ◯ | 0/10 | 2.8 |
| 5 | 0.12 | ◯ | ⊚ | ◯ | ◯ | ◯ | 0/10 | 1.8 |
| 6 | 0.12 | ◯ | ⊚ | ◯ | ◯ | ◯ | 0/10 | 1.7 |
| Comp. Ex. No. | | | | | | | | |
| 1 | 0.03 | ◯ | X | X | ◯ | X | 0/10 | 0.1> |
| 2 | 0.04 | ◯ | ◯ | X | X | X | 0/10 | 2.9 |
| 3 | 0.04 | ◯ | ◯ | X | X | X | 0/10 | 2.8 |
| 4 | 0.13 | X | X | X | X | X | 3/10 | 4.4 |
| 5 | 0.07 | ◯ | ◯ | X | ◯ | ◯ | 10/10 | 7.4 |
| 6 | 0.11 | ◯ | ◯ | ◯ | ◯ | ◯ | 4/10 | 4.5 |
| 7 | 0.08 | ◯ | ◯ | X | ◯ | ◯ | 10/10 | 7.9 |

TABLE 4

| | Polishing Rate (μm/minute) | | | |
|---|---|---|---|---|
| | Immediately After Preparation | Two Weeks After Preparation | One Month After Preparation | Three Months After Preparation |
| Ex. No. | | | | |
| 1 | 0.13 | 0.13 | 0.13 | 0.13 |
| 2 | 0.13 | 0.13 | 0.13 | 0.13 |
| 3 | 0.13 | 0.13 | 0.13 | 0.13 |
| 4 | 0.12 | 0.12 | 0.12 | 0.12 |
| 5 | 0.12 | 0.12 | 0.12 | 0.12 |
| 6 | 0.12 | 0.12 | 0.12 | 0.12 |
| Comp. Ex. No. | | | | |
| 1 | 0.03 | 0.03 | 0.03 | 0.03 |
| 2 | 0.04 | 0.04 | 0.04 | 0.04 |
| 3 | 0.04 | 0.04 | 0.04 | 0.04 |
| 4 | 0.13 | 0.13 | 0.13 | 0.13 |
| 5 | 0.07 | 0.07 | 0.05 | 0.03 |
| 6 | 0.11 | 0.07 | 0.05 | 0.04 |
| 7 | 0.08 | gelated | — | — |

It is seen from the results in Tables 3 and 4 that all of the polishing compositions obtained in Examples 1 to 6 have polishing properties such that polishing rates are high, that surface roughness and waviness are reduced, and that surface defects, scratches and fine scratches are not generated. Especially when compared with the polishing compositions obtained in Comparative Examples 1 to 7, the polishing compositions obtained in Examples 1 to 6 have low Rmax and excellent storage stability, from the viewpoint of high polishing rates.

Incidentally, in a case of Comparative Example 4 where an inorganic phosphonic acid is used, the polishing composition shows excellent storage stability from the viewpoint of the polishing rate. However, the polishing composition is poor in all of the evaluation results under the surface roughness, the waviness, the surface defects, the scratches, and the fine scratches.

According to the polishing composition of the present invention, the polishing can be carried out at a higher polishing rate, with improving the surface quality of the polishing substrate. Also, the polishing composition has excellent storage stability after the formulation, so that polishing can be carried out at a higher polishing rate for a long period of time. Therefore, there is exhibited an effect that a magnetic disk substrate having excellent surface quality can be efficiently produced.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polishing composition comprising:
    i) an abrasive comprising two or more types of silica particles, wherein said silica particles have a particle size distribution as admixed silica particles of two or more types of silica particles such that a ratio of D90/D50 is from 1.3 to 3.0, and D50 is from 10 to 600 nm, wherein D90 is defined as a particle size at 90% counted from a smaller size side on a number base in a cumulative particle size distribution, and wherein D50 is defined as a particle size at 50% counted from a smaller size side on a number base in a cumulative particle size distribution,
    ii) an oxidizing agent;
    iii) a polishing accelerator comprising an organic phosphonic acid; and
    iv) water.

2. The polishing composition according to claim 1, wherein said silica particles have a particle size distribution prior to mixing such that a ratio of D50L to D50S (D50L/D50S) is from 1.1 to 4.0, and a weight ratio of A to B (A/B) is from 90/10 to 10/90, wherein D50L is defined as D50 of silica particles (B) having the largest D50, and D50S is defined as D50 of silica particles (A) having the smallest D50.

3. The polishing composition according to claim 1, wherein said silica particles have a particle size distribution as admixed silica particles of two or more types of silica particles such that a percentage at 40 nm counted from a smaller size side on a number base in a cumulative particle size distribution is 25% or less, and D50 is from 50 to 600 nm.

4. The polishing composition according to claim 1, wherein the abrasive is colloidal silica, and the oxidizing agent is hydrogen peroxide.

5. The polishing composition according to claim 1, wherein the polishing composition is capable of polishing a magnetic disk substrate.

6. The polishing composition of claim 1, wherein said abrasive has an average primary particle size of 0.001 to 3 $\mu$m.

7. The polishing composition of claim 1, wherein said abrasive has an average secondary particle size of from 0.05 to 3 $\mu$m.

8. A method for manufacturing a substrate, comprising polishing a substrate to be polished with the polishing composition of any one of claims 1 to 7.

9. The method according to claim 8, wherein the substrate to be polished is a magnetic disk substrate.

10. A method for polishing a substrate comprising contacting the substrate with the polishing composition of any one of claims 1 to 7.

11. A process for reducing fine scratches of a substrate, comprising contacting the substrate with the polishing composition of any one of claims 1 to 7, wherein the reducing is relative to the amount of fine scratches on the substrate prior to the contacting.

12. A process for accelerating polishing of a magnetic disk substrate, comprising contacting the polishing composition of any one of claims 1 to 7 with a magnetic disk substrate wherein the accelerating is relative to polishing the magnetic disk substrate in the absence of the polishing composition.

* * * * *